United States Patent

[11] 3,548,909

[72] Inventor Benjamin Sander
 No. 2 Price Meadows, Olivette, Mo. 63132
[21] Appl. No. 776,121
[22] Filed Nov. 15, 1968
[45] Patented Dec. 22, 1970

[54] SWIVEL HOOK
 4 Claims, 7 Drawing Figs.
[52] U.S. Cl. ................................................ 152/241
[51] Int. Cl. ................................................ B60c 27/00
[50] Field of Search .................................... 152/241;
 24/239, 242
[56] References Cited
 UNITED STATES PATENTS
 831,745 9/1906 Rice .............................. 24/239

2,825,381 3/1958 Eddy ........................... 152/241

Primary Examiner—James B. Marbert
Attorney—Ralph W. Kalish

ABSTRACT: A swivel hook for connecting cross chains and side chains of a tire chain having an enlarged head, a shank extending from said head and having a hook portion; one leg of said hook being provided with a detent resiliently biased toward the other leg for creating a restricted passage therebetween of less transverse extent than the cross section of the stock of which the links of the cross chains are made so as to prevent accidental disengagement of the same from said hook after being received therein, subsequent to detent-depressing travel through said passage.

PATENTED DEC 22 1970

3,548,909

INVENTOR
BENJAMIN SANDER
BY Ralph W. Kalish
ATTORNEY 3,548,909

SWIVEL HOOK

BACKGROUND AND SUMMARY OF THE INVENTION

This invention relates in general to chains and, more particularly, to a swivel hook for interconnecting component chains of a chain assembly, such as the cross chains and side chains of a tire chain.

It is an object of the present invention to provide a swivel hook which is adapted for facile engagement with the links of a cross chain and a side chain for connecting the same into an integrated chain assembly.

It is another object of the present invention to provide a swivel hook of the character stated which is readily disposed in operative condition without the utilization of tools so that the same is amenable to usage by unskilled personnel. It is a still further object of the present invention to provide a swivel hook of the character stated which incorporates detent means for providing a reliable engagement with chain components so as to be stable in operative condition and resistant to accidental displacement during usage.

It is a still further object of the present invention to provide a swivel hook of the type stated which may be most economically manufactured; which is constructed of durable material so as to be resistant to wear; and which is adapted for usage in conjunction with various types of chains as employed or industrial machinery, tractors, trucks, snow plows, and the like.

DESCRIPTION OF THE PREFERRED EMBODIMENT

Figure 1:
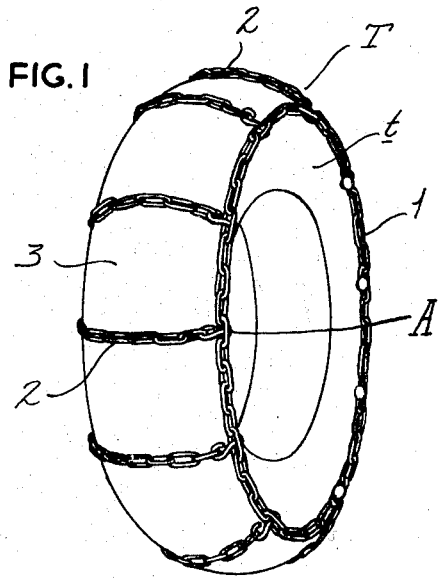
FIG. 1 is a perspective view of a tire having mounted thereon a tire chain comprising side chains and a plurality of cross chains connected by a swivel hook constructed in accordance with the embodying the present invention.

Referring now by reference characters to the drawing which illustrates the preferred embodiment of the present invention, A generally designates a swivel hook for use with chain assemblies such as an antiskid tire chain, indicated generally at T in FIG. 1, and comprising the customary pair of side or rim chains 1 for disposition on opposite sides of a tire, indicated at t, and a plurality of cross chains 2 extending transversely across the tread portions 3 of tire t in circumferentially spaced relationship thereabout. Side chain 1 comprises the usual links 4 being of elongated character and having parallel spaced-apart bar portions 5, 5', being preferably of circular cross section and connected by substantially semicircular end portions 6, 6' for defining relatively long openings 7. Links 4 of chain 1 are mutually interengaged in the customary fashion so that adjacent links are normally in substantially perpendicular planar relationship but being adapted for mutual relative swingable movement. Cross chains 2 are similarly comprised of the usual links designated 8 and incorporating spaced-apart parallel bar portions 9, 9' connected at their ends by substantially semicircular end portions 10, 10' for defining an elongated aperture 11. The links 8 of cross chains 2 are interengaged in the usual manner.

Although openings 7 of side chain 1 may, if desired, be of like extend as openings 11 of links 8 of cross chains 2, it is customary that the transverse dimension of said opening 7 be slightly relatively greater.

As will be observed in FIG. 1, side chains 1 are of continuous unbroken character so as to be of annular configuration when in operative position, while cross chains are of generally linear character for extending across the tire tread 3 between corresponding portions of the side chains 1.

Swivel hook A is thus provided for effecting interconnection between side chains 1 and cross chains 2 and comprises a relatively enlarged head or base 12, the width or diameter of which is greater than the transverse extent of opening 7 of links 1 (see FIG. 2), there being a shank 13 extending centrally of said head 12 and in its portion spaced from said head said shank 13 is outwardly curved, as at 14, and then reversely curved, as at 15, to form a hook, designated generally 16, being thus comprised of an inner leg 17, an outer leg 18, and an intervening curved, bight-forming portion 19. Outer leg 18 is in general axial parallel relationship to inner leg 17 and terminates spacedly from head 12 for developing an enlarged spacing, as at 20, for promoting access into the passage 21 between legs 18, 19 which passage terminates in the inner diameter 22 of hook 16. The transverse extent of passage 21 and inner diameter 22 are slightly greater than the cross-sectional diameter of side bars 9, 9' and end portions 10, 10' of cross chain links 8 for purposes presently appearing.

Formed on the inner face of outer leg 18 proximate its free end extremity, and directed toward the confronting face portion of inner leg 17 is a recess or socket 23 for accommodating a compression spring 24 of tapered cross section, one end of which bears against the base of recess 23 and the other end of which bears against a detent 25 constituting a ball which is thus urged into passage 21 for creating a neck or restricted zone 26. Detent 25 is thus urged outwardly by spring 24 and may be forced inwardly against the bias of spring 24 by applied pressure to be described below; said detent 25 being prevented from accidental displacement from socket 23 by the edge of said socket, as at 27, being peened so as to create an opening of less diameter than the diameter of detent 25.

Figure 2:
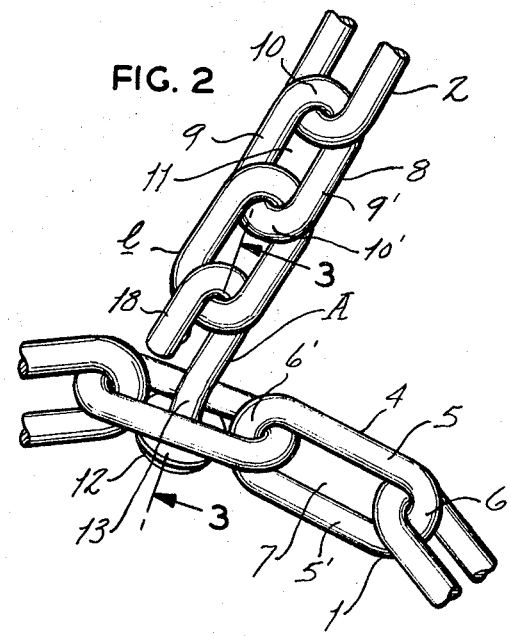
FIG. 2 is an enlarged fragmentary, perspective view illustrating the swivel hook of the present invention in operative position.
Figure 3:
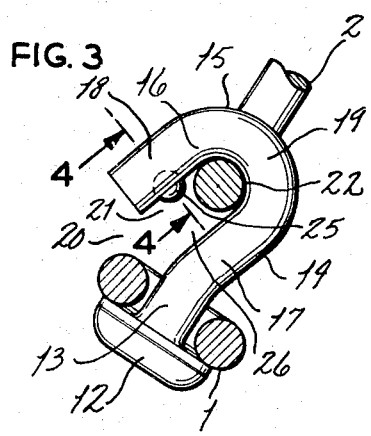
FIG. 3 is a vertical transverse sectional view taken on the line 3-3 of FIG. 2.
Figure 4:
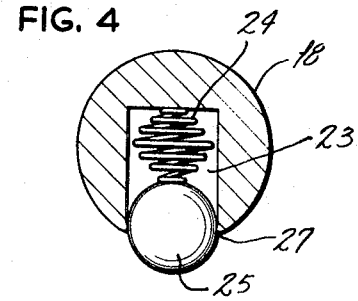
FIG. 4 is a horizontal transverse sectional view taken on the line 4-4 of FIG. 3.
Figure 5:
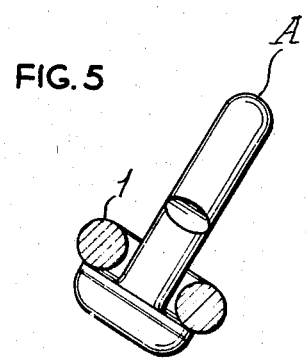
FIG. 5 illustrates the initial step in engaging the swivel hook to a link in a side chain.
Figure 6:
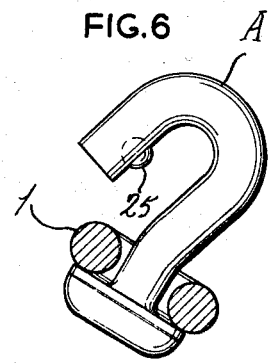
FIG. 6 is a perspective view illustrating the subsequent step of turning the swivel hook after extension through the side chain link.
Figure 7:
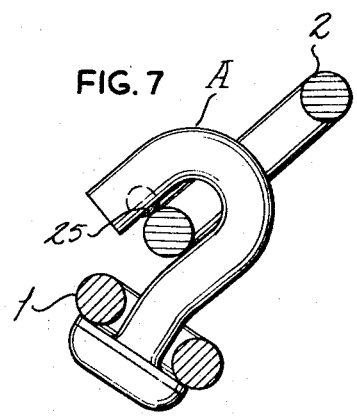
FIG. 7 is taken substantially along line 3-3 of FIG. 2 but illustrating the cross chain link at the point of contacting the detent during its relative movement into engaged condition.

In usage, swivel hook A is first engaged with the particular link 4 of side chain 1 by passing hook 15 and shank 13 through opening 7 so as to bring side bars 5, 5' into abutment upon the shank-adjacent face of head 12 (as shown in FIGS. 2 and 3). It will be observed that the diameter of the stock forming shank 13 and hook 15 is less than the transverse extent of opening 7 so as to allow the aforesaid relative movement. After having effected such extension of swivel hook A through opening 7 the said hook is turned through an angle of 90° (as shown in FIG. 2) by which disposition swivel hook A is prevented from undesired return passage through opening 7 since the cross-sectional extent of hook 15 is greater than the transverse dimension of opening 7.

With swivel hook A so presented, the user then addresses an end link, as indicated at 1, of cross chain 2 to the hook portion 15 of hook A by presenting end portion 10' to spacing 20 and thence into passage 21. As said end portion 10' contacts detent 25 the same, through the pulling force applied thereon, cammingly causes said detent 25 to move inwardly within recess 23 causing a stressing of spring 24. As end portion 10' moves beyond detent 25, losing contact therewith, the latter is then freed to return to outwardly projecting position under release of the tension on spring 24 so as to recreate neck or restricted zone 26. Thus, said end portion 10' is received within the inside diameter of hook 15 (see FIG. 3) and is restrained against return, outward movement by reason of the constriction of neck 26 by detent 25. The normal pressures exerted upon link 1 through customary usage of chain A are insufficient to overcome spring 24 so that reliable interengagement between hook A and side chain 2 is assured. Since the inside diameter 22 of hook 15 is of slightly greater extent than the diameter of the stock forming links 8, and latter are movable within said diameter relative to hook 15 so that appropriate swiveling and swinging action is permitted.

It is apparent that if the transverse extent of opening 7 of side chain links 2 were relatively reduced so that hook portion 15 and shank 13 of hook A could not freely pass therethrough, the appropriate side chain link 4 could be engaged upon swivel hook A by following the same engaging procedure hereinabove described with respect to links 8 but wherein the end portions would not remain in the inside diameter 22 of hook portion 15 as the particular link 4 would be moved relatively downwardly along inner leg 17 and shank 13 until side bars 5, 5' were in abutting relationship with head 12.

In view of the foregoing it is apparent that swivel hook A provides a ready means for effecting interconnection between chain members, such as side chains 1 and cross chains 2, without the necessity of resorting to utilization of tools. The novel detent 25, while assuring of ease of assembly, yet most reliably and effectively prevents disengagement of said hook A so that the interconnected chain members are resistant against accidental disassembly.

I claim:

1. In a tire chain having a side chain composed of interconnected elongate links each having side bar portions and rounded end portions forming elongated openings through the links and a cross chain having elongated end links composed of side bar portions and rounded end portions providing an elongated opening through said end links; a swivel hook for removably connecting one of the links of the side chain with one of said end links of the cross chain comprising; an enlarged head having a cross section greater than the transverse extent of the links of said side chain; a shank projecting from said head and being of relatively reduced cross section; a hook portion continuous with said shank and having an inner leg, an outer leg, and a connecting arcuate portion defining the inside diameter of the bight established by said inner and outer legs and said arcuate portion, said inside diameter being slightly greater than the cross section of the side bar and end portions of said cross chain; said outer leg having a socket opening toward said inner leg; resilient means provided within said socket, a detent member mounted within said socket in engagement with said resilient means, said resilient means urging said detent member toward said inner leg, means for retaining a portion of said detent within said socket against the bias of said resilient means, the distant between said detent member and said inner leg when the former is in extended condition being less than the cross section of the side bars and end portions of the cross chain end links.

2. The invention as defined in claim 1 and further characterized by said detent member comprising a ball, said means for retaining a portion of said detent within said socket comprising said socket having a diametrically reduced portion adjacent the outer portion thereof whereby said ball will protrude a distance less than one-half the diameter thereof.

3. The invention as defined in claim 2 and further characterized by the linear distance between the inside diameter of the bight and the protruding portion of said ball detent being slightly greater than the diameter of the rounded end portion of said chain.

4. The invention as defined in claim 2 and further characterized by said resilient means comprising a coil compression spring of tapered contour.

UNITED STATES PATENT OFFICE
CERTIFICATE OF CORRECTION

Patent No. 3,548,909　　　　　　　　　　Dated December 22, 1970

Inventor(s) Benjamin Sander

It is certified that error appears in the above-identified patent and that said Letters Patent are hereby corrected as shown below:

In the heading to the printed specification, insert -- assignor to Nixdorff-Krein Mfg. Co., St. Louis, Mo., a corporation of Delaware --. Column 4, line 26, before "chain insert -- cross --.

Signed and sealed this 13th day of April 1971

(SEAL)
Attest:

EDWARD M. FLETCHER, JR.　　　　　　WILLIAM E. SCHUYLER, JI
Attesting Officer　　　　　　　　　　Commissioner of Patent: